United States Patent [19]

Provi

[11] Patent Number: 4,457,385
[45] Date of Patent: Jul. 3, 1984

[54] PLATFORM SCALE WITH BENDABLE LOAD SENSING BEAM

[75] Inventor: Mike A. Provi, Rockford, Ill.
[73] Assignee: The Brearly Company, Rockford, Ill.
[21] Appl. No.: 625,193
[22] Filed: Oct. 23, 1975
[51] Int. Cl.³ .................... G01G 3/14; G01G 21/08
[52] U.S. Cl. .................................... 177/211; 177/256
[58] Field of Search .................. 177/126, 211, 256

[56] References Cited

U.S. PATENT DOCUMENTS

| | | | |
|---|---|---|---|
| 2,899,191 | 8/1959 | Hunt | 177/211 |
| 3,469,645 | 9/1969 | Provi et al. | 177/210 |
| 3,666,031 | 5/1972 | Provi et al. | 177/186 |
| 3,938,603 | 2/1976 | Shoberg et al. | 177/211 |

*Primary Examiner*—George H. Miller, Jr.
*Attorney, Agent, or Firm*—Leydig, Voit, Osann, Mayer & Holt, Ltd.

[57] ABSTRACT

A platform type weighing scale having four platform suspensions mounting a scale platform on a base, a bendable load sensing beam supported by a pair of spaced beam suspensions on the base, first and second transfer means respectively interconnecting first and second pairs of said platform suspensions to each other and to sensing beam at first and second points spaced along the beam to preselected distance from the first and second beam suspensions respectively to apply first and second forces to the sensing beam in a direction transverse thereto that are respectively correlative with the sum of the loads applied to the first and second pairs of platform suspensions, and electrical transducer means for sensing the sum of the moments produced in the sensing beam by the first and second forces.

4 Claims, 4 Drawing Figures

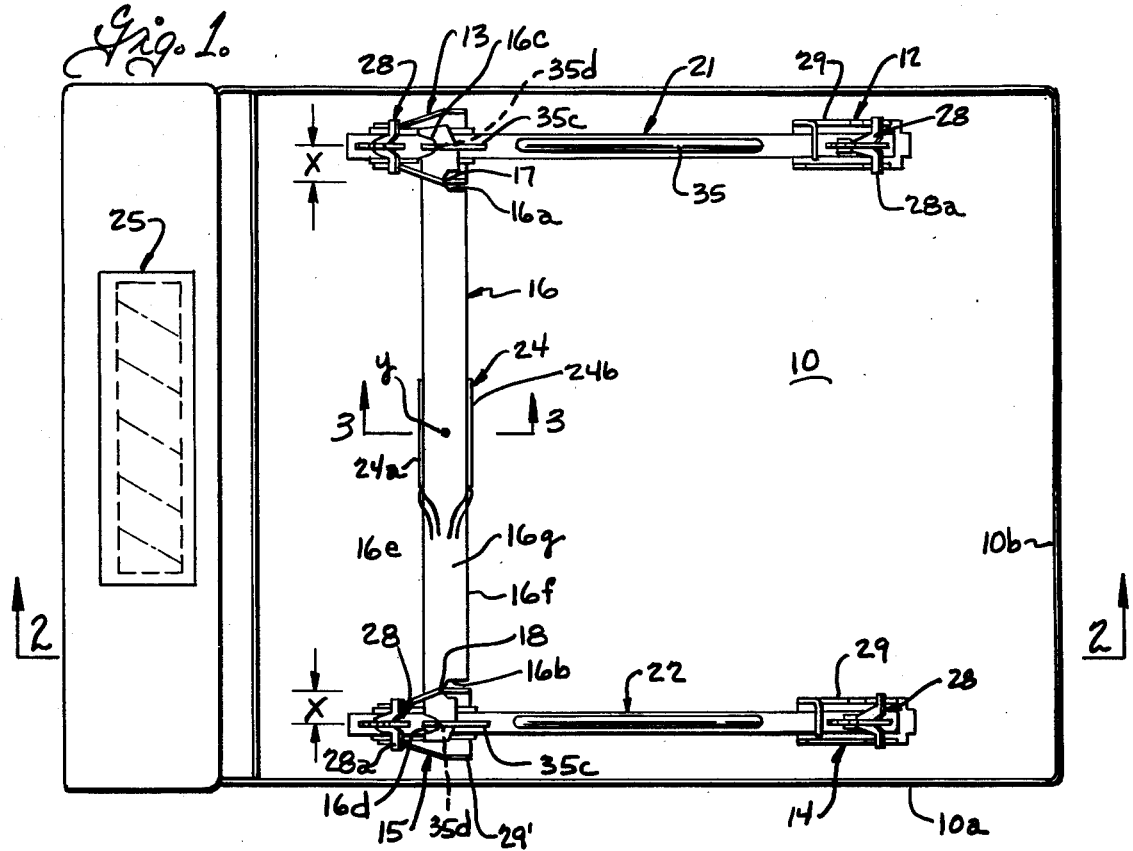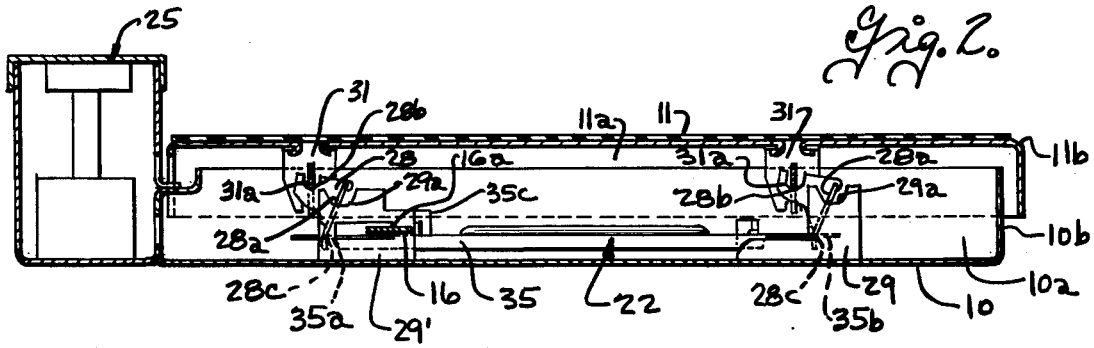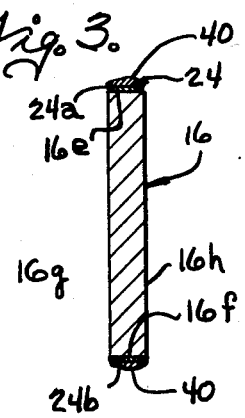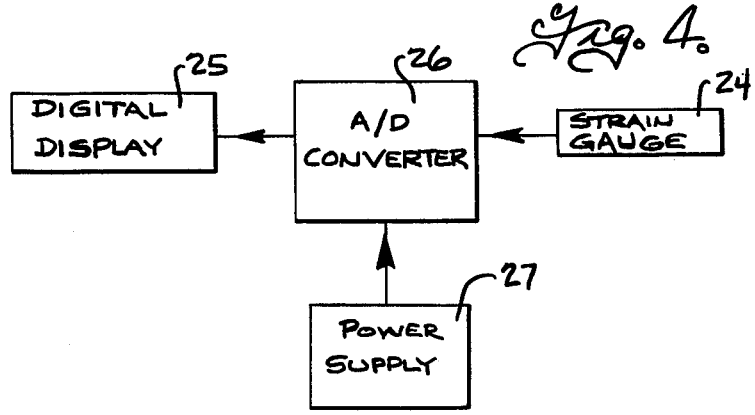

PLATFORM SCALE WITH BENDABLE LOAD SENSING BEAM

BACKGROUND OF THE INVENTION

Platform type weighing scales are commonly subject to non-uniform loading on the scale platform. It is difficult to provide a single platform support for a relatively large scale platform that is capable of withstanding substantial non-uniform loading, and it has heretofore been proposed to make platform scales with four platform suspensions with various different mechanisms for summing the loads applied to all four suspensions and for actuating a weight display. Some platform scales, for example as shown in U.S. Pat. No. 3,666,031, interconnect first and second pairs of levers and utilize two transfer levers to operate a spring biased weight indicating device. Some other platform scales, for example as shown in U.S. Pat. No. 3,465,838, utilize four levers to transmit the loads on the four platform suspensions to a common load cell, such as a hydraulic or electric load cell. However, the aforementioned platform scales utilizing two transfer levers or four transfer levers require substantial additional apparatus for mounting the weight indicating mechanism and for applying the forces from the several levers to the weight indicating mechanism in order to actuate the latter in accordance with the sum of the forces on the several levers.

It has also been proposed, for example as shown in U.S. Pat. No. 3,258,078 to provide load sensing devices such as strain gauges in each of the four platform suspensions and to electrically sum the signals from the four load sensing elements on the four platform suspensions. However, even small differences in the rate and linearity of response of the four load sensing elements would cause variations in the indicated weight with different distribution of the load or weight on the scale platform. It is therefore necessary to carefully select and match the four load sensing elements used in each scale for both linearity and rate of response in order to make a scale of this type which is relatively insensitive to non-uniform loading.

SUMMARY OF THE INVENTION

It is the general object of the present invention to overcome the disadvantages of the prior art by providing a platform type weighing scale using four platform suspensions and having an improved arrangement for summing the loads applied to the several suspensions and which is substantially insensitive to variations in distribution of the load on the platform.

Another object of this invention is to provide a platform type weighing scale utilizing a single bendable load sensing beam and having an improved arrangement for applying the loads from the four platform suspensions to the load sensing beam and for sensing the resultant bending moment in the beam to produce an output signal which is substantially independent of distribution of the load on the scale platform.

Still another object of this invention is to provide a platform type weighing scale that can be reliably mass produced.

Accordingly, the present invention provides a platform type weighing scale having four platform suspensions for mounting the platform on the base, a single bendable load sensing beam supported by first and second spaced beam suspensions on the base, first and second transfer means respectively interconnecting first and second pairs of the platform suspensions to each other and to the sensing beam at first and second locations spaced equal distances from a point medially between the first and second beam suspensions to apply first and second forces to the sensing beam in a direction crosswise of its length, which first and second forces are respectively correlative with the sum of the loads applied to the first and second pairs of platform suspensions, and electrical transducer means for sensing the sum of the moments produced in the sensing beam by the first and second forces.

The electrical transducer means preferably comprises a strain gauge or gauges mounted on the sensing beam at a location to sum the bending moments in the beam.

These, together with other objects, features and advantages of the invention will be more readily understood by reference to the following detailed description, when taken in connection with the accompanying drawings wherein:

FIG. 1 is a plan view of a platform scale with the scale platform removed, and illustrating a scale construction embodying the present invention;

FIG. 2 is a longitudinal sectional view to the scale of FIG. 1;

FIG. 3 is a fragmentary sectional view through the bending beam taken on the plane 3—3 of FIG. 1; and FIG. 4 is a schematic electrical diagram for the scale of FIG. 1.

The scale in general includes a relatively rigid base 10 and a platform 11, with four platform suspensions 12-15 for mounting the platform on the base. The scale utilizes a single bendable load sensing beam 16 which is supported adjacent opposite ends on first and second spaced beam suspensions 17 and 18, and first and second transfer mechanisms 21 and 22 are provided for interconnecting first and second pairs of the platform suspensions to each other and to relatively opposite ends of the sensing beam 16 to produce bending moments in the beam correlative with the load supplied to the four suspensions. Electrical transducer means 24 are provided for sensing the sum of the forces applied to the beam and the output of the electrical transducer is utilized to operate a visual display 25 through a signal converter 26 powered by a power supply 27.

The base 10 is conveniently in the form of a relatively flat tray having upstanding side and end walls 10a and 10b to aid in rigidifying the same and the tray base may be provided with embossings or ribs (not shown) to further stiffen and rigidify the same in the manner well understood in the art. The scale platform 11 is also conveniently formed with depending side and end walls 11a and 11b to rigidify the same and may also be formed with suitable embossings or ribs to rigidify the same.

The platform suspensions 12-15 are located at four corners of a generally rectangular pattern and, in the embodiment herein shown, the platform suspensions include four suspension levers 28 which are pivotally supported by base brackets 29, 29' on the base. The scale platform 11 is supported by platform brackets 31 on the suspension levers 28. The suspension levers 28, base brackets 29, and platform brackets 31 shown herein are conveniently of the type more fully disclosed in U.S. Pat. Nos. 3,460,642; 3,478,818 and 3,666,031, to which reference is hereby made for a more complete description. In general, the levers 28 are of similar construction and each include a bell-crank having laterally extending trunnions 28a that are pivotally supported in wide-angle V-notches 29a in spaced legs of the base brackets 29 and 29' for pivotal movement about a generally horizontal axis. Each of the platform brackets 31 are conveniently similarly constructed and each have a knife edge 31a that engages a wide-angle V-notch 28b in the respective bell crank at a location horizontally offset from the trunnions 28a. As best shown in FIG. 1, the bell cranks 28 in the platform suspensions 12 and 13 are supported for pivotal movement about relatively parallel axes and, similarly, the bell cranks in platform suspensions 14 and 15 are also supported for pivotal movement about relatively parallel axes. The bell cranks of platform suspensions 12 and 13 are interconnected by the first transfer mechanism 21 and the bell cranks of 14 and 15 are similarly interconnected by the second transfer mechanism 22. As best shown in FIG. 2, each of the bell cranks is formed with a wide-angle V-notch 28c at a location offset below its trunnions 28a and the first and second transfer mechanisms 21 and 22 comprise generally horizontal links 35 formed with openings adjacent opposite ends that define knife edges 35a and 35b adjacent opposite ends. The knife edges 35a and 35b engage the V-notches 28c in respective pairs of the bell cranks to interconnect the same and effectively sum the loads applied through the platform to the pairs of bell cranks.

The links 35 are moved horizontally in response to pivotal movement of the associated pair of bell cranks and operate to mechanically sum the loads applied to the respective pair of bell cranks. The bending beam 16 is positioned to extend crosswise of the direction of movement of the links 35 and the platform suspensions 17 and 18 are herein shown in the form of generally vertical knife edges 29d' conveniently formed on one pair of 29' of the base support brackets and which knife edges engage wide-angle V-notches 16a and 16b adjacent opposite ends of the bending beam. The links 35 are each formed with brackets 35c that define generally vertical knife edges 35d engageable in wide-angle V-notches 16c and 16d adjacent opposite ends of the ends of the beam 16. The V-notches 16c and 16d are spaced relatively equal distances, designated X in FIG. 1, from the respective adjacent base fulcrum 17, 18 and the V-notches 16c and 16d are also spaced equally from a point designated Y that is medially between the base fulcrums 17 and 18.

The transfer mechanism 21 applies a first force to the bending beam in a plane parallelling the plane of action of its link 35, which first force is correlative with the sum of the loads applied to the first and second platform suspensions 12 and 13 and the second transfer mechanism 22 applies a second force to the bending beam in a direction crosswise of the length of the bending beam, and which second force is correlative in magnitude wit the sum of the loads applied to the third and fourth platform suspensions 14 and 15. The first and second forces on the bending beam each operate to produce a bending moment in the beam in directions such that the bending moments produced by the two forces are additive. The total bending moment in the beam 16 is accordingly correlative with the sum of the first and second forces applied at the locations of the V-notches 16c and 16d and hence is correlative with the total load applied to the platform through the four platform suspensions. For any give total load on the scale platform 11, the sum of the first and second forces applied to the beam by the transfer mechanisms 21 and 22 will be independent of the load distribution on the scale platform, but the relative amplitude of the first and second forces applied by transfer mechanisms 21 and 22 to the beam will vary depending upon the distribution of the load on the platform. However, the sum of the bending moments produced by the first and second forces acting on relatively opposite ends of the beam 16 will remain substantially constant at the point Y medially between the beam suspensions 17 and 18, notwithstanding changes in distribution on the load applied to the pairs of platform suspensions 12, 13 and 14, 15.

The sum of the bending moments in the beam 16 produced by the first and second forces acting at relatively opposite ends of the beam is sensed by the electrical transducer means 24. The stress moment at any cross-section of a beam is equal to the bending moment at the location of that cross-section along the beam. The electrical transducer means is advantageously of the electrical type strain gauge type mounted on the sensor beam to sense the longitudinal strains in the beam produced by the sum of the bending moments on the beams. The electrical strain gauges may, for example, be a wire type strain gauge utilizing strain sensitive wire or a piezorestive type strain gauge. The strain gauge sensors are mounted symmetrically with respect to the point Y on the beam located medially between the first and second beam suspensions 17 and 18 and the strain gauges are mounted to sense the longitudinal strains produced in the beam as it is deflected in the plane of action of the forces applied to the beam by the first and second transfer mechanisms 21 and 22. A single strain gauge could be utilized at one edge of the beam to sense either the tensile or compressive strains in the beam. However, in order to increase the output of the transducer, a pair of strain gauges designated 24a and 24b are mounted on relatively opposite edges of the beam. Since one edge of the beam is in tension and the other in compression, the resistances of the strain gauges 24a and 24b will vary relatively opposite in magnitude. In order to make the resistances of the two strain gauges vary substantially equal amounts in opposite directions in response to the applied forces, the gauges are mounted on edges of the beam that are spaced equal distances from the neutral surface of the beam, that is the longitudinal section of a beam where there is no change in the length of the fibers and no tensile or compressive forces acting on them. The beam 16 is conveniently a simple beam of generally rectangular cross-section and, in such a simple beam, the neutral surface is medially between opposite side edges 16e and 16f of the beam. As is well understood in the art, the strain gauges are affixed to the edges of the beam by a suitable cement indicated at 40 in FIG. 3. The output of the strain gauges is enhanced by increasing the length of the strain gauges in a direction paralleling the strain to be measured and, as shown in FIG. 1, the strain gauges are elongated in the direction lengthwise of the beam but are mounted on the beam in a manner to be longitudinally symmetrical with respect to the midpoint Y of the beam.

The output of the strain gauges is utilized to actuate the visual display 25. The visual display can take various forms and may, for example, include an electrical meter responsive to the change in impedance of the strain gauges produced by the load forces applied to the beam and calibrated to indicate the weight applied to the platform. In the embodiment illustrated, the strain gauges are arranged to actuate digital type visual display 25 and, as diagrammatically shown in FIG. 4, are connected to an analog-to-digital converter 26 that is powered from a power supply 27 and which is operative to actuate the digital display.

From the foregoing it is thought that the construction and operation of the scale will be readily understood. The weight applied to the scale platform 11 is transmitted to the four platform suspensions 12–15 and the load applied to each of the suspensions will vary somewhat dependent on the load distribution on the scale platform. The load transfer mechanisms 21 and 22 respectively interconnect pairs of the platform suspensions 12, 13 and 14, 15 to effectively sum the loads applied to the respective pairs of suspensions, and the load transfer mechanisms 21 and 22 in turn apply forces to the relatively opposite ends of the bending beam 16 correlative with the sum of the loads applied to the respective pair of platform suspensions. The bending beam is subjected to bending moments correlative with the forces applied by the transfer mechanisms 21 and 22 to produce a total bending moment in the beam correlative with the sum of the bending moments produced by the separate forces. The electrical strain gauges 24a and 24b are mounted on the beam to sense the sum of the bending moments produced in the beam by the first and second forces applied by transfer mechanisms 21 and 22 and are located medially between the ends of the beam. Changes in load distribution on the scale platform do produce relative changes in amplitude of the first and second forces applied to the beams by the first and second transfer mechanisms 21 and 22. However, the algebraic sum of the first and second forces will remain constant for any given total load on the scale platform. As previously described, the sum of the bending moments produced at this location in the beam by the first and second forces will be substantially the same for any given load on the scale platform, notwithstanding variations in the load distribution on the scale platform. The cross-sectional dimensions and hence the stiffness of the beam is selected in accordance with the transducer characteristics and the load range for which the scale is to be used, to produce an output from the electrical transducer in a range sufficient to reliably operate the visual display 25 through the signal converter 26. However, the total deflection of the beam, even under full load, is very small so that there is substantially no wear on the fulcrums of the platform suspensions 12–15 or transfer mechanisms 21 and 22. In addition, the strain gauge transducers are preferably centered between opposite side faces 16g and 16h of the beam so as to enhance the immunity of the sensors to strains induced in the beam in a direction crosswise of the plane of bending.

The embodiments of the invention in which an exclusive property or privilege is claimed are defined as follows:

1. Load-measuring apparatus comprising a load-support platform for receiving a load,
   a plurality of mechanical load-sensing devices operatively connected to said platform at points spaced on the platform, each device including a part which transmits a force in a predetermined direction with sensing by the device of a load, the amount of such force transmitted by the part being in direct proportion to the amount of the load sensed,
   an elongated bar,
   a pair of spaced-apart fulcrum means for supporting said bar located adjacent and inwardly of the bar's opposite ends,
   electromechanical deflection-sensing means mounted on said bar intermediate its said ends for following bending of the bar in one direction in a selected plane, and for producing from such following an electrical response which is directly indicative of the amount of such bending, and
   for each load-sensing device, coupling means coupling said part in said device and said bar for producing bending in the bar in said plane and in said one direction in direct proportion to the amount of force transmitted by said part in said predetermined direction with sensing of a load by the device, said coupling means including links connecting with the opposite ends of said bar outwardly of said fulcrum means.

2. In a platform type weighing scale including a base and a scale platform, four suspension levers each having a first mounting means pivotally supporting the same on the base at the four corners of a generally rectangular pattern and a second mounting means supporting the scale platform on the suspension levers at locations horizontally offset from said first mounting means, first and second beam fulcrum means spaced apart on said base, a single elongated bendable load sensing beam mounted on said first and second beam fulcrum means, a first link means operatively connecting a first pair of said suspension levers to said beam at a first location spaced along the beam from said first beam fulcrum means to apply a first force to said beam in a direction crosswise of its length and which first force is correlative with the sum of the loads applied through the scale platform to said first pair of suspension levers, a second link means operatively connecting a second pair of said suspension levers to each other and to said beam at a second location spaced along the beam from said second beam fulcrum means to apply a second force to said sensing beam in a direction crosswise of its length and which second force is correlative with the sum of the loads applied through said scale platform to said second pair of suspension levers, the directions of said first and second forces and said first and second locations along the beam being so arranged that the first and second forces produce bending in the same direction in the beam between said first and second beam fulcrum means, and electromechanical deflection-sensing means responsive to the bending of said beam in one direction in a selected plane and between said first and second beam fulcrum means, said deflection-sensing means being operable to produce an electrical response which is directly indicative of the amount of such bending.

3. In a platform type weighing scale including a base and a scale platform, a single elongated bendable load sensing beam, first and second spaced beam fulcrum means supporting the beam at spaced locations on the base for bending in a generally horizontal plane, four bell crank levers, lever mounting means mounting said levers on the base at four corners of a generally rectangular pattern for pivotal movement about horizontal pivot axes extending generally parallel to each other and to the beam, the four levers being arranged in first and second pairs adjacent opposite ends of the beam with the levers of each pair spaced apart in a direction crosswise of their pivot axes, platform mounting means connecting the platform to the levers at locations offset in the same horizontal direction from the pivot axis of the respective lever, a first link means connected to the levers of said first pair at locations vertically offset from their respective pivot axis and operatively connected to the beam at a first location spaced along the beam from said first beam fulcrum means to apply a first force to said beam in a direction crosswise of its length and which first force is coorelative with the sum of the loads applied through the scale platform to said first pair of levers, a second link means connected to the levers of said second pair at locations vertically offset from their respective pivot axis and operatively connected to the beam at a second location spaced along the beam from said second beam fulcrum means to apply a second force to said beam in a direction crosswise of its length and which second force is correlative with the sum of the loads applied through said scale platform to said second pair of levers, the directions of said first and second forces and said first and second locations along the beam being so arranged that the first and second forces produce bending in the same direction in the beam between said first and second beam fulcrum means, and electromechanical deflection-sensing means responsive to the bending of said beam in one direction in a selected plane and between said first and second beam fulcrum means, said deflection-sensing means being operable to produce an electrical response which is directly indicative of the amount of such bending.

4. Load-measuring apparatus comprising a load-support platform for receiving a load,
a plurality of mechanical load-sensing devices operatively connected to said platform at points spaced on the platform, each device including a part which transmits a force in a predetermined direction with sensing by the device of a load, the amount of such force transmitted by the part being in direct proportion to the amount of the load sensed, an elongated bar, a pair of spaced-apart fulcrum means for supporting said bar located adjacent and inwardly of the bar's opposite ends, electromechanical deflection-sensing means responsive to the bending of said beam in one direction in a selected plane and operable to produce an electrical response which is correlated to the amount of such bending, and for each load-sensing device, coupling means coupling said part in said device and said bar for producing bending in the bar in said plane and in said one direction in direct proportion to the amount of force transmitted by said part in said predetermined direction with sensing of a load by the device, said coupling means including links connecting with the opposite ends of said bar outwardly of said fulcrum means.

* * * * *